June 23, 1942.  P. K. HICKS  2,287,760
LUBRICATOR
Filed June 22, 1939
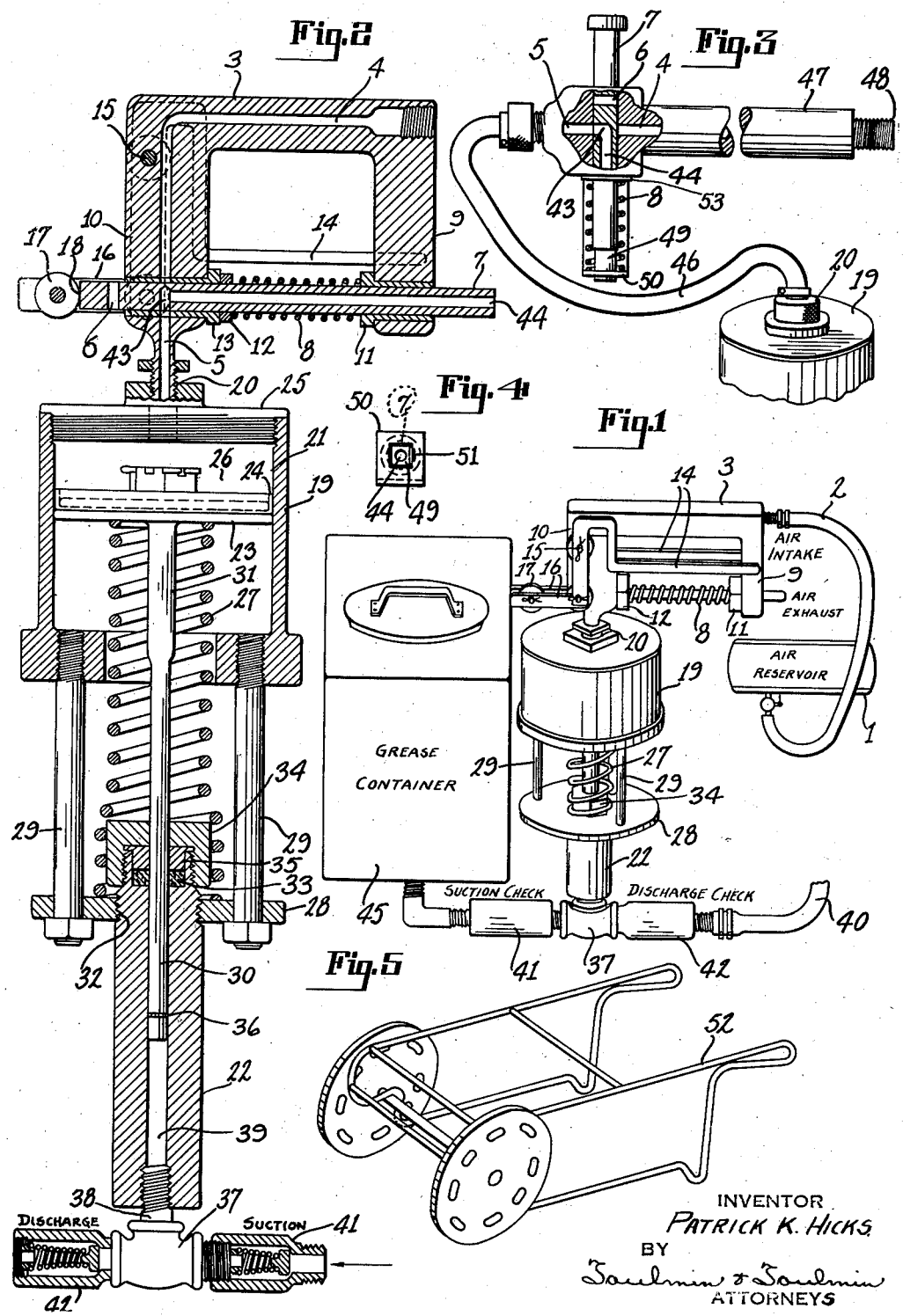
INVENTOR
PATRICK K. HICKS
BY
Toulmin & Toulmin
ATTORNEYS Patented June 23, 1942

2,287,760

UNITED STATES PATENT OFFICE 2,287,760

LUBRICATOR

Patrick K. Hicks, Columbus, Ohio

Application June 22, 1939, Serial No. 280,587

3 Claims. (Cl. 221—47.1)

This invention relates to a lubricator and more particularly to a lubricator adapted to supply lubricant under pressure to fittings of the type commonly used on automobiles, locomotives and other machines which have wearing surfaces which are to be supplied with lubricant periodically. The invention is particularly adapted to supply grease under pressure to fittings of the type known as "Alemite" fittings.

It is my object to devise an improved lubricating device adapted to force lubricant into bearings to be lubricated by means of a fluid such as air under pressure which is not allowed to comingle with the lubricant being supplied to the fittings.

It is another object to provide lubricating mechanism which insures a thorough application of grease to the parts in the least possible time and with as heavy a grease as can be used.

It is another object to provide such a lubricating mechanism which is operated by air pressure and which is capable of being quickly and easily connected to any source of pair pressure of the desired pressure and which is particularly adapted to lubricate those fittings where great force is needed to secure a positive lubrication.

It is another object to provide a lubricating device of the foregoing type which is adapted to supply a much greater amount of lubricant with one manipulation than hand lubricating pumps heretofore employed. When employing the device described herein, the operator need press on the air valve only once in order to completely lubricate parts which with a hand grease pump would require at least five manipulations of the hand pump in order to supply an equivalent amount of grease. Moreover, the device described herein will lubricate fittings which it would be impossible to lubricate with a hand grease pump.

It is another object to provide in a device of the foregoing type a control valve which is in the form of a handle easily grasped by the operator and which may optionally be connected to the grease gun by flexible air conduit so that the operator may grasp the control valve in one hand and operate it with the same hand whereby to secure the desired action of the grease gun of this invention. Alternatively, the control valve may be mounted as a handle on the top of the pressure gun where it serves as a convenient handle for the pressure gun as well as a control valve for the same.

Still another object is to provide a lubricating device having a charge-receiving chamber in the form of a cylinder with a tightly fitting plunger or piston therein which is adapted upon retraction to draw a charge of lubricant into the chamber and upon being pushed into the chamber, to expel such a lubricant charge under high pressure to the fitting being lubricated, this plunger being retracted by spring pressure and being pushed inwardly by air pressure acting upon a second piston of relatively large diameter.

Other objects will more fully hereinafter appear.

Referring to the accompanying drawing:

Figure 1 is a front perspective view of one form of my invention.

Figure 2 is a sectional view of the grease gun and check valves of Figure 1.

Figure 3 is a front elevation, partly in section, of a modified form of air control valve which is adapted to be grasped and operated by one hand and which is connected to the grease gun by a flexible conduit.

Figure 4 is a bottom plan view of the downwardly projecting end of the control valve shown in Figure 3.

Figure 5 is a perspective of a form of dolly or wagon which may be employed for transporting the lubricator of the present invention and if desired, air compression mechanism, around the automobile or locomotive lubricating station where the device of this invention is to be employed.

Referring to the drawing in detail and particularly to the embodiment shown in Figures 1 and 2, reference numeral 1 designates an air reservoir which is connected to the lubricating device of this invention by the flexible conduit 2 which supplies air under pressure to the handle and control valve designated generally as 3. It is preferred to have the air so supplied at an average pressure of at least 120 pounds per square inch. The air under pressure is transmitted through the control valve 3 by means of conduits 4 and 5 which are adapted to be interconnected by means of conduit 6 which is disposed in the end of slidable valve rod 7. Rod 7 is normally pressed into the position shown in Figure 2 by spring 8 which is disposed between two downwardly projecting portions 9 and 10 of handle 3. Spring 8 bears against fixed shoulder bushing 11 and its opposite end presses against a collar 12 which is fixedly attached to rod 7 so as to be slidable therewith and which acts as a stop for limiting the leftward movement of rod 7 to the position shown in Figure 2. Rod 7 is formed with a non-circular cross-section or with a keyed slot so as to prevent it from rotating in bushings 11 and 13 whereby it is maintained in the proper operating position. Rod 7 is adapted to be moved to the right by means of two-part operating lever 14 which is pivoted to handle 3 at 15 and which when pulled upwardly, pulls two-part lever 16 with roller 17 which is attached thereto to the right. Roller 17 engages the outer end 18 of rod 7 and, therefore, when handle 14 is pulled upwardly, rod 7 is pushed to the right against the resistance of spring 8 until slot 6 is in alignment with conduits 4 and 5. Roller 17 operates as a stop to limit rightward movement of rod 7 by limiting rightward movement of lever 16.

Handle and valve 3 is attached to the pressure gun designated generally as 19 at 20. Pressure gun 19 comprises an air cylinder 21 and a lubricant cylinder 22 disposed therebelow. In air pressure cylinder 21, there is disposed a piston 23 which is provided with suitable sealing means such as leather ring 24. The upper portion of cylinder 21 is closed by means of a cylinder head 25, into which handle 3 is screw-threaded in such manner as to effect air tight engagement and in such manner as to transmit air pressure between conduit 5 and between chamber 26 formed above piston 23. Piston 23 is urged upwardly towards cylinder head 25 by spring 27 which bears against a shoulder plate 28 which is disposed below cylinder 21 and which is kept from moving away from cylinder 21 by tie rods 29.

In lubricant charge receiving cylinder 22, there is disposed a tightly fitting piston 30 which is a prolongation of rod 31 which is integral with piston 23 so that movement of piston 23 is transmitted to lubricant piston or plunger 30. Lubricant charge receiving cylinder 22 is immovably attached to thrust plate 28 by means of screw-threads 32 and the tight sealing of the slidable rod 31 with respect to the upper end of cylinder 22 is secured by means of packing 33 which is compressed by gland nut 34 and crowding ring 35. In order to further insure the tight sealing of the end of piston 30 with respect to cylinder 22, a piston ring 36 is provided adjacent the lower end of piston 30. If desired, more than one piston ring 36 may be employed. Ring 36 is slotted in the usual manner so as to insure a fluid-tight seal.

Disposed below charge receiving chamber 22 is a T 37 which is in fluid connection with the chamber 39 formed in cylinder 22 by means of a nipple 38. T 37 is adapted to be connected either to grease container 45 or to flexible conduit 40, depending upon the motion of pistons 23 and 30 in their respective cylinders. Disposed between T 37 and grease container 45 is a suction check valve 41 which is adapted to allow grease to flow from grease container 45 into T 37 but to prevent flow of grease or fluid from T 37 in the opposite direction. Disposed between T 37 and conduit 40 is a check valve 42 which is adapted to allow grease under pressure to flow from T 37 into conduit 40 but which is adapted to close whenever suction is applied to T 37 so as to prevent the passage of either grease or air from conduit 40 back into 37. Conduit 40 is attached in the usual manner at its outer end (not shown) to the fitting which is to be lubricated.

The strength of spring 27 is determined by the pair pressure which is available, being greater, the greater the air pressure available. If desired, suitable adjusting means for adjusting the pressure with which spring 27 bears against piston 23 may be provided so that the operator may adjust the compressive action of spring 27 in accordance with the air pressure available.

Disposed in rod 7 is a vertical slot 43 which is connected to the atmosphere by a slot 44 running lengthwise of rod 7. Slot 43 is normally in engagement with conduit 5 so that chamber 26 is normally in connection with the atmosphere. Thus, if lever 14 has been raised so as to supply air pressure through slot 6 to chamber 26 and lever 14 is released, the air pressure built up in chamber 26 is discharged through slots 43 and 44 to the atmosphere as a result of the pressure of spring 27 against piston 23.

In operation, conduit 40 is connected to the fitting to be lubricated. Lever 14 is then raised, causing air pressure to be transmitted from air reservoir 1 into chamber 26 and causing piston 23 to move downwardly against the pressure of spring 27. Piston 30 is simultaneously moved downwardly, causing check valve 41 to close and causing the air in chamber 39 to pass outwardly through check valve 42 into conduit 40. The operator then releases lever 14, whereupon air chamber 26 is connected to the atmosphere and its pressure is discharged by means of spring 27 pressing piston 23 upwardly. Piston 30 simultaneously moves upwardly and causes a suction in chamber 39 and in T 37 which suction causes check valve 41 to open and check valve 42 to close. This suction is transmitted to grease container 45 and draws a supply of grease through valve 41 into T 37 and into lubricant receiving chamber 39. The device is now adapted to supply lubricant to conduit 40 under pressure. In order to do this, the operator again moves lever 14 upwardly, thus building up air pressure in chamber 26 and causing pistons 23 and 30 to move downwardly, the pressure closing valve 41 and opening valve 42, thereby forcing the grease into conduit 40 under very high pressure. Upon releasing lever 14, the air accumulated in chamber 26 travels out to the atmosphere and spring 27 again operates pistons 23 and 30 so as to draw a fresh charge of lubricant from grease supply 45 into chamber 39 and T 37.

In the modified form shown in Figures 3 and 4, the control valve is separated from the pressure gun by a conduit 46 which may be of any desired length so as to allow the operator to hold it in the hand at a considerable distance from the pressure gun. The source of air pressure is connected to the body portion 47 of the control valve at 48 and is transmitted through the valve by means of conduits 4 and 5 which are adapted to be inter-connected by slot 6 provided in slidable rod 7 which projects upwardly from body portion 47 so as to be readily operable by the thumb of the hand holding the control valve. As before, rod 7 is normally spring pressed upwardly by a spring 8 acting against the washer-like protuberance 53 fixedly carried on the middle portion of rod 7 so that rod 7 is normally in the position shown in Figure 3, in which the air chamber 26 of pressure gun 19 is in free communication with the atmosphere through slots 43 and 44, slot 44 extending as before to the end of rod 7. Rod 7 is adapted to be pressed downwardly so as to connect conduit 4 with conduit 5 through slot 6. Rod 7 is provided at its lower portion with a square end 49 which engages a square hole 51 in the end of spring support 50 so as to prevent rod 7 from turning and thereby preventing proper operation. The length of the stroke of rod 7 in either direction is determined by the length of the square section 49 and the location of the washer-like protuberance 53 on the rod 7.

By the use of an air-actuated piston of relatively large area operating a lubricant-expelling piston of relatively very small area, the pressure on the lubricant may be made extremely high, the air pressure being multiplied enormously. For example, employing an air-operated piston two inches in diameter and a lubricant-expelling piston one-fourth of an inch in diameter, with an air pressure of 120 lbs. per square inch, the lubricant will be expelled under a pressure of 7680 lbs. per square inch. Other air pressures and proportions may obviously be used, those set forth being merely illustrative of the principle. Thus low-cost air under relatively low pressure is employed to lubricant fittings under extremely high pressure.

Another advantage of the present invention is that the pressure gun 19 may be located anywhere in the line between grease container 45 and the fitting to be lubricated. The connection between suction check valve and grease supply 45 may be a flexible conduit similar to conduit 40 and of any desired length, T 37 and check valves 41 and 42 being disposable at any point, thus making for greater flexibility and convenience in assembly and in use.

If desired, a two wheeled dolly or wagon 52 may be provided for supporting and transporting the grease container and pressure gun, and, if desired, suitable air compressing means so that the same may be readily moved about the lubricating station.

It will be seen from the foregoing, that I have devised a highly useful mechanism for the application of grease under high positive pressure to fittings to be lubricated. The device is very convenient to use and its use results in a better lubrication of the automobile, locomotive or like. Since a source of air pressure is commonly available at automobile lubricating stations, the device is particularly applicable to use in such stations. The device may also be used for the lubrication of locomotives, in which case it may be connected to the air reservoir on the locomotive.

It is to be understood that I intend to comprehend as within my invention such modifications as may be necessary to adapt it to varying conditions and uses.

Having thus fully described my invention, what I claim as new and desire to secure by Letters Patent, is:

1. A lubricating device comprising means forming a lubricant receiving chamber, a plunger reciprocable therein, an air cylinder fixedly attached to said chamber-forming means, a piston reciprocable therein and fixedly connected to said plunger, a manually operable control valve having a substantially U-shaped body to provide a carrying handle for the device, means mounting said valve upon said cylinder having a cylinder-connecting conduit therein, said handle having a cored passageway providing an inlet passage for admitting air under pressure and conducting said air through said handle into said cylinder-connecting conduit, a manually reciprocable rod journaled transversely of and within the legs of the U-shaped handle for intersecting said passageway, said rod having a bore therein for interconnecting the intersected portions of said passageway when said rod is in one position, and having another bore therein adapted to connect said cylinder-connecting conduit to the atmosphere when said rod is in another position, said rod being adapted to seal off said inlet passageway when said rod is in said other position.

2. A lubricating device comprising means forming a lubricant receiving chamber, a plunger reciprocable therein, an air cylinder fixedly attached to said chamber-forming means, a piston reciprocable therein and fixedly connected to said plunger, a manually operable control valve having a substantially U-shaped body to provide a carrying handle for the device, means mounting said valve upon said cylinder having a cylinder-connecting conduit therein, said handle having a cored passageway providing an inlet passage for admitting air under pressure and conducting said air through said handle into said cylinder connecting conduit, a manually reciprocable rod journaled transversely of and within the legs of the U-shaped handle and adapted to intersect said passageway, said rod having a bore therein adapted to interconnect the intersected portions of said passageway when said rod is in one position and having another bore therein adapted to connect said cylinder connecting conduit to the atmosphere when said rod is in another position, said rod being adapted to seal off said inlet passageway when said rod is in said other position, and lever means pivotally mounted on said handle to manually actuate said rod.

3. A lubricating device comprising means forming a lubricant receiving chamber, a plunger reciprocable therein, an air cylinder fixedly attached to said chamber-forming means, a piston reciprocable therein and fixedly connected to said plunger, a manually operable control valve having a body portion shaped in a manner to provide a carrying handle for the device, means mounting said valve upon said cylinder having a cylinder-connecting conduit therein, said handle having a cored passageway providing an inlet passage for admitting air under pressure and conducting said air through said handle into said cylinder connecting conduit, a manually reciprocable rod journaled within the body of the handle and adapted to intersect said passageway, said rod having a bore therein adapted to interconnect the intersected portions of said passageway when said rod is in one position and having another bore therein adapted to connect said cylinder connecting conduit to the atmosphere when said rod is in another position, said rod being adapted to seal off said inlet passageway when said rod is in said other position.

PATRICK K. HICKS.